United States Patent [19]

Skerritt

[11] Patent Number: 4,636,777
[45] Date of Patent: Jan. 13, 1987

[54] MONITORING ARRANGEMENT FOR A GAS TURBINE SPARK IGNITION SYSTEM

[75] Inventor: Robert C. Skerritt, Bulkington, England

[73] Assignee: Lucas Industries Public Limited Company, Birmingham, England

[21] Appl. No.: 606,241

[22] Filed: May 2, 1984

[30] Foreign Application Priority Data

May 11, 1983 [GB] United Kingdom ............. 8312965

[51] Int. Cl.[4] .............................................. G08B 21/00
[52] U.S. Cl. .................................. 340/635; 73/118.1; 310/311; 340/658; 367/199
[58] Field of Search ............... 340/635, 608, 566, 943, 340/531, 628, 658, 385, 539; 324/51; 73/116, 118, 117; 310/311; 367/197, 199

[56] References Cited

U.S. PATENT DOCUMENTS

| | | | |
|---|---|---|---|
| 2,659,881 | 11/1953 | Bogot et al. | 340/608 |
| 3,016,457 | 1/1962 | Brown et al. | 340/566 X |
| 3,665,445 | 5/1972 | Riley, Jr. | 340/566 |
| 3,895,344 | 7/1975 | Gill, Jr. et al. | 340/943 |
| 4,279,027 | 7/1981 | Van Sloun | 340/943 X |
| 4,307,387 | 12/1981 | Baxendale | 340/566 |
| 4,417,235 | 11/1983 | Del Grande | 340/531 |
| 4,473,821 | 9/1984 | Yang et al. | 340/539 |

Primary Examiner—James L. Rowland
Assistant Examiner—Daniel Myer

[57] ABSTRACT

A monitoring arrangement for a gas turbine spark ignition system in which the spark discharge current oscillates at a known frequency includes a sonic sensor acoustically coupled to the spark igniter, a filter for passing only those signals from this sensor which have a frequency corresponding to that of the discharge current and indicating means responsive to the filter output for indicating that the spark igniter is operating. An additional optical sensor may provide a signal response to a spark gap in the ignition system, signals from both sensors being required to energize the indicating means.

7 Claims, 4 Drawing Figures

MONITORING ARRANGEMENT FOR A GAS TURBINE SPARK IGNITION SYSTEM

This invention relates to a monitoring arrangement for a spark ignition system for starting a gas turbine engine.

During starting, gas turbine engines are commonly ignited by a spark device which is energized by a relatively high voltage from a supply unit. It is required to monitor operation of the spark igniter device. Detection of discharge current is unsatisfactory since the possibility of insulation breakdown other than at the head of the spark device cannot be excluded. Additionally, any monitoring arrangement must be able to withstand the temperature and other adverse environmental conditions adjacent the combustion chamber of a gas turbine engine.

The present invention makes use of the fact that a common type of unit for supplying the ignition voltage includes components which act as a resonant circuit, whereby the discharge current across the igniter is in the form of a damped oscillation whose frequency is known in advance. A sonic transducer acoustically coupled to the spark igniter device is used to pick up the sound of the discharge across the end of the device.

As described hereafter an arrangement for monitoring operation of a spark ignition system in which the discharge current oscillates at a known frequency, comprises a sonic transducer adapted to be coupled acoustically to a spark igniter in said system, and means for detecting the presence of a signal from said transducer at a frequency substantially equal to that of said discharge current.

Embodiments of the invention will now be described by way of example only and with reference to the accompanying drawings in which.

Figure 1:
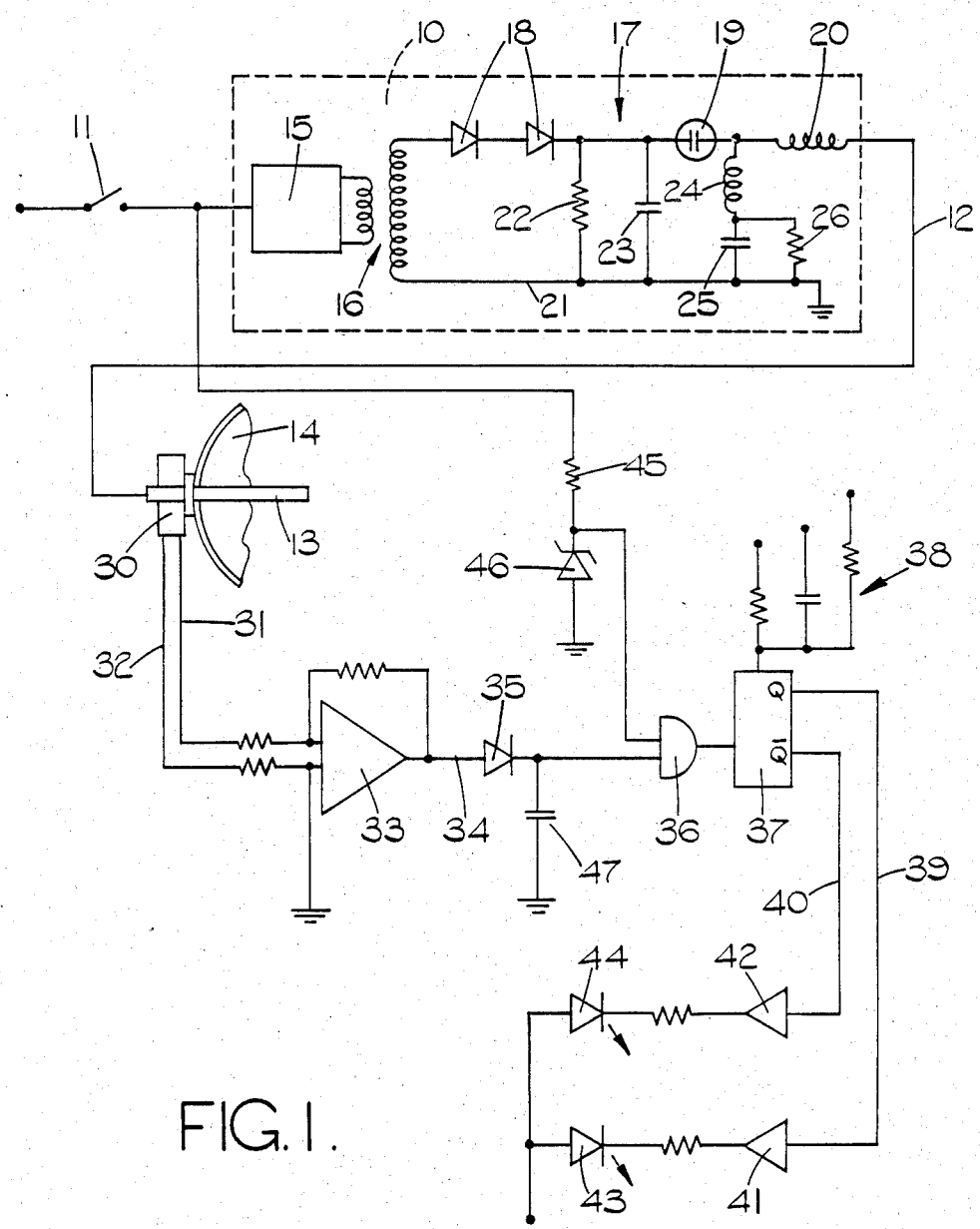
FIG. 1 is a diagram of an igniter system for a gas turbine engine.

As shown in FIG. 1 an ignition control unit 10 is responsive to application of a 28 v d.c. supply by means of a switch 11, to provide a high voltage on a line 12 to a spark igniter device 13 mounted in a wall of a combustion chamber 14 of a gas turbine engine. The unit 10 is of the general type disclosed in U.K. Pat. No. 896161 and includes an oscillator circuit 15 coupled through a transformer 16 to an output circuit 17. The output circuit 17 includes two rectifying diodes 18, a 3 KV discharge gap 19 and a 40-turn winding 20 connected in series between one end of the secondary of the transformer 16 and the line 12. The other end of the transformer secondary is connected to an earth rail 21. A 10 megohm bleed resistor 22 and a 0.6 μF capacitance 23 are connected in parallel between the rail 21 and the input of the discharge gap 19. The output side of the discharge gap 19 is connected to the rail 21 through a 9-turn coil 24 and a 0.03 μF capacitor 25 arranged in series. A 2K ohm resistor 26 is connected in parallel with the capacitor 25. The coils 20, 24 combine to provide an autotransformer by means of which the voltage on the line 12 may be raised.

With the oscillator circuit 15 energized the capacitor 23 is charged through the diodes 18 until the discharge gap 19 breaks down at 3 KV. Current flow through the coil 24 and capacitor 25 causes the autotransformer to raise the voltage on line 12 to provide an ignition pulse of 11 KV and 20 nano seconds duration on the line 12. The foregoing process is repeated so long as the switch 11 remains closed, whereby igniter pulses are repeatedly provided on the line 12, typically at intervals of 0.75 seconds.

Figure 2:
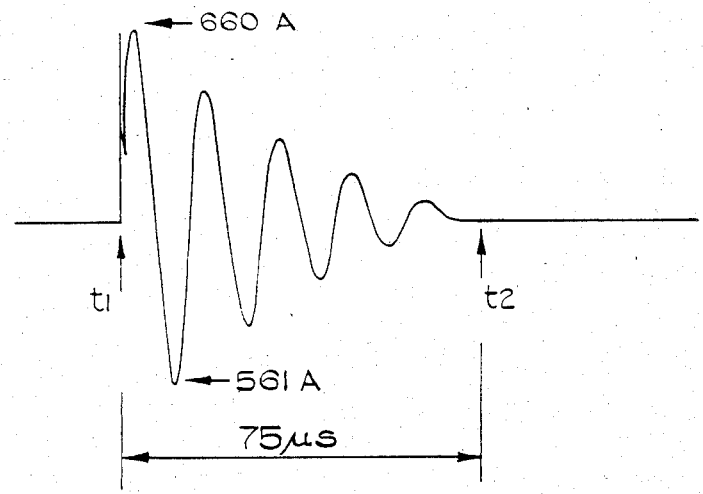
FIG. 2 shows a typical waveform of igniter discharge current.

If the spark igniter 13 is operating satisfactorily a discharge will be initiated by each pulse on the line 12. The coil 20 and the capacitor 23 act as a series resonant circuit, and the discharge current across the tip of the igniter 13 takes the form of a damped oscillation of constant frequency, as shown in FIG. 2, the duration of the discharge typically being 75μ seconds. The frequency of the oscillation is dependent on the values of the coil 20 and the capacitor 23, and in the present case is between 66 and 69 KHz.

A sonic transducer 30, for example a piezo electric device, is mounted on the igniter, or otherwise sonically coupled thereto, and provides output signals on lines 31, 32 in response to discharge across the tip of the igniter 13. The lines 31, 32 are connected to the input terminals of a bandpass filter amplifier 33, to provide an output pulse on a line 34 in response only to signals in the region of 66–69 KHz on the lines 31, 32. Pulses on the line 34 are supplied through a diode 35 to an input of an AND gate 36. The diode 35 co-operates with a capacitor 47 to rectify the output signals from the amplifier 33. The other input of the gate 36 is supplied with a signal derived from the 28 volt input to the control arrangement 10, through a dropping resistor 45, this signal being maintained at a required level by a zener diode 46.

The gate 36 thus provides an ouput signal only when the switch 11 is closed and the spark igniter 13 discharges, and this output is applied to a monostable multivibrator 37 of the type available from Texas Instruments under the designation SN54121 whose operating time is set by a resistor and capacitor arrangement 38 to be longer than the 0.75 second repetition period of the unit 10. The monostable 37 provides a signal at its Q output in response to an output signal from the gate 36, and the Q output signal is maintained so long as the switch 11 is closed and the igniter 13 is operating correctly. In all other conditions the monostable 37 provides a signal at its $\overline{Q}$ output. The Q and $\overline{Q}$ signals are applied via respective lines 39, 40 and amplifiers 41, 42 to indicator devices 43, 44 which in the present example are light-emitting diodes. Device 44 is thus energized at all times in which the ignition system is not operated, and indicates that the detector arrangement logic is functioning correctly. Device 43 is energized only when the ignition system is energized through the switch 11 and results in an ignition discharge at the device 13.

Figure 3:
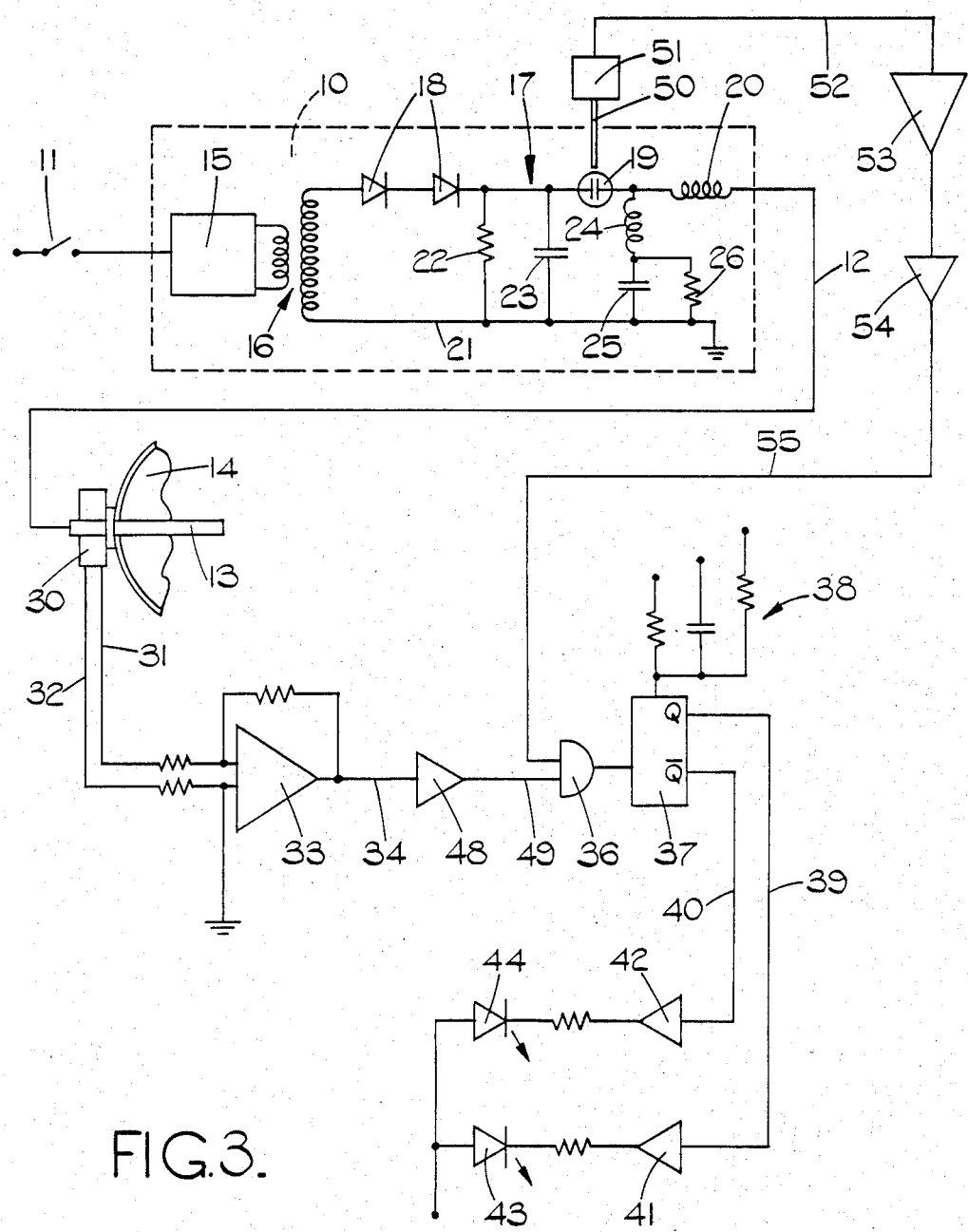
FIG. 3 shows modification of the system of FIG. 1.
Figure 4:
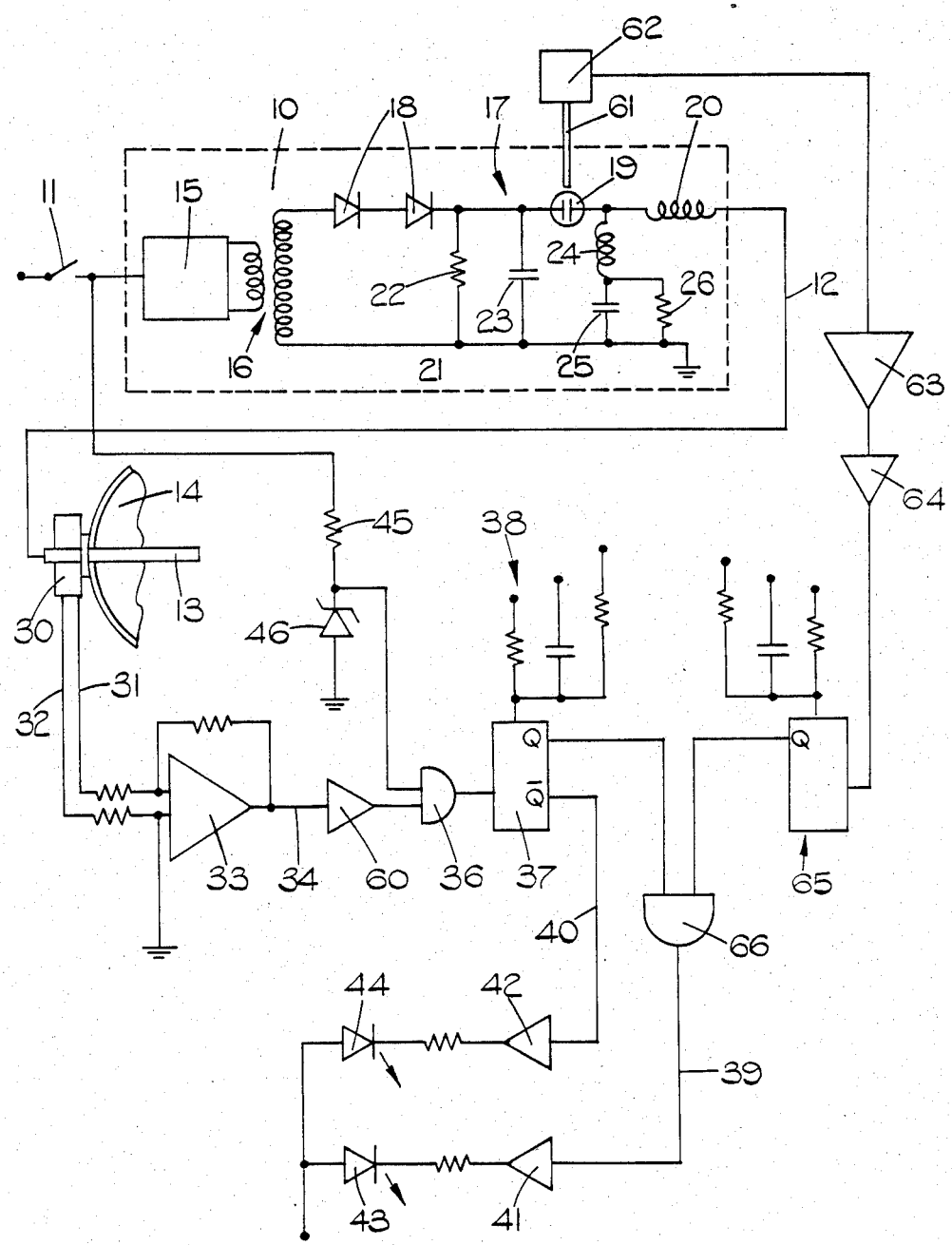
FIG. 4 shows a further modification of the system of FIG. 1.

Though the amplifier 33 provides an output in response only to input signals in the 66–69 kHz region, it cannot be predicted that during start up of an engine vibrations in this frequency range will not be generated by sources other than the igniter 13. FIGS. 3 and 4 show a modified arrangement by means of which an indication by the device 43 may be more certainly attributed to satisfactory ignition discharge.

The arrangement shown in FIG. 3 is generally similar to that shown in FIG. 1, corresponding elements having identical reference numbers. A circuit 48 is substituted for the diode 35 and capacitor 47 shown in FIG. 1, and in addition to rectifying the output signals from the filter amplifier 33, both shapes the rectified signals and extends their duration from the 75μ seconds of the discharge time. The output signals from the circuit 48 are applied on a line 49 to one input of the AND gate 36. Light resulting from operation of the discharge gap 19 is supplied through a fibre optic element 50 to a known type of device 51 which provides electrical signals on a line 52 in response to discharge across the gap 19. The signals on line 52 are applied to an amplifier 53 and thence through a circuit 54 similar to the circuit 48. The output signals from circuit 54 are applied on a line 55 to a second input of the AND gate 36. The components 45, 46 shown in FIG. 1, which provide an indication that the switch 11 is closed, are omitted in the embodiment shown in FIG. 3, but in a modified form of that embodiment may be included and provide a signal to a third input of the AND gate 36.

The signals on lines 49 and 55 substantially coincide when the ignition system is operating correctly, so that in this condition the device 43 is energized. In all other conditions, including those in which signals on line 49 originate from spurious vibrations, no indication is given by the device 43.

The arrangement shown in FIG. 4 is also generally similar to that of FIG. 1, corresponding elements being identically numbered. As in the arrangement of FIG. 3 a circuit 60 is substituted for the diode 35 and capacitor 47, and performs the functions of rectifying, shaping and extending the signals from the filter amplifier 33. Light from the discharge gap 19 passes through a fibre optic element 61 to a device 62 identical with the device 51 in FIG. 3. Electrical signals from the device 62 are amplified, rectified, shaped and extended by circuits 63, 64 corresponding to the amplifier 53 and circuit 54 respectively in FIG. 3. Signals from the circuit 64 are applied to a monostable arrangement 65 corresponding to the arrangement 37, 38.

Signals from the Q outputs of the monostable arrangements 37, 38 and 65 are supplied to an AND gate 66 whose output signals are applied on the line 39 to the amplifier 41. Input signals to the gate 66 are substantially coincident when the ignition system is operating correctly, in which condition the gate 66 provides an output signal to energize the indicator device 43, as described above. In all other conditions the device 44 is energized.

I claim:

1. An arrangement for monitoring operation of a spark ignition system in which the spark discharge current oscillates at a known frequency to determine when that system is operating properly, said arrangement comprising a sonic transducer for acoustic coupling to a spark igniter in said system, said sonic transducer producing a transducer signal for all acoustic signals detected thereby, a detecting circuit having output signal generating means for providing an output signal in response only to transducer signals from said transducer at frequencies substantially equal to that of said discharge current, said detecting circuit including a bandpass filter connected to said sonic transducer to receive said transducer signals therefrom and which activates said output signal generating means to generate said output signal only for transducer signals from said sonic transducer which are within a frequency range corresponding to that of said discharge current, and indicating means connected to said detecting circuit and responsive to said output signal from said detecting circuit, means for providing a first signal when an energizing voltage is applied to said spark ignition system, and gating means for providing a second signal to said indicating means only in the presence of said first signal and of a signal from said bandpass filter.

2. An arrangement as claimed in claim 1 in which said detecting circuit further includes first timing means for generating energizing signals for said indicating means, said energizing signals having durations longer than the repetition period of the signals from said filter.

3. In a spark ignition system for a gas turbine engine having a spark igniter and means for generating a spark discharge current which oscillates at a known frequency, an arrangement for monitoring operation of said ignition system for determining when said spark ignition system is operating properly, comprising a sonic transducer acoustically coupled to said spark igniter, and which generates transducer signals for all acoustic signals detected thereby, a detecting circuit having output signal generating means for providing an output signal in response only to transducer signals from said sonic transducer which have frequencies substantially equal to those of said discharge current, said detecting circuit including a bandpass filter connected to said sonic transducer to receive said transducer signals therefrom and which activates said output generating means to generate said output signal only for transducer signals from said sonic transducer which are within a frequency range corresponding to that of said discharge current, and indicating means responsive to said output signal from said detecting circuit, means for providing a first signal when an energizing voltage is applied to said spark ignition system, and gating means for providing a second signal to said indicating means only in the presence of said first signal and of a signal from said bandpass filter.

4. An arrangement for monitoring operation of a spark ignition system in which the spark discharge current oscillates at a known frequency, said arrangement comprising a sonic transducer for acoustic coupling to a spark igniter in said system, a bandpass filter for providing an output in response only to signals from said transducer which are within a frequency range corresponding to that of said discharge current, optical sensing means for producing a first indicating signal in response to operation of said spark igniter, indicating means responsive to a second indicating signal, and gating means for generating said second indicating signal only in the presence of said first indicating signal and an output from said bandpass filter.

5. An arrangement as claimed in claim 4 in which said first indicating signal is applied to said gating means.

6. An arrangement as claimed in claim 4 which includes first timing means responsive to repeated output signals from said bandpass filter for generating energizing signals for said indicating means, said energizing signals having durations longer than the repetition period of the signals from said filter.

7. An arrangement as claimed in claim 6 which includes a second timing means responsive to signals from said optical sensing means for causing said second indicating signals to have durations which are longer than the repetition period of the signals from said filter, and a further gating means for providing an energizing signal for said indicating means only in the presence of output signals from said first and second timing means.

* * * * *